United States Patent
Yoon et al.

(10) Patent No.: US 9,959,029 B2
(45) Date of Patent: May 1, 2018

(54) SYSTEM AND METHOD FOR PERFORMING SCROLL USING SCROLLTOP ATTRIBUTE OF WEB PAGE

(71) Applicant: SK PLANET CO., LTD., Seoul (KR)

(72) Inventors: Jeong Hyun Yoon, Incheon (KR); Eun Bok Lee, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 131 days.

(21) Appl. No.: 14/116,536

(22) PCT Filed: Jul. 18, 2013

(86) PCT No.: PCT/KR2013/006434
§ 371 (c)(1),
(2) Date: Nov. 8, 2013

(87) PCT Pub. No.: WO2014/058137
PCT Pub. Date: Apr. 17, 2014

(65) Prior Publication Data
US 2015/0205512 A1    Jul. 23, 2015

(30) Foreign Application Priority Data
Oct. 12, 2012 (KR) .................. 10-2012-0113257

(51) Int. Cl.
*G06F 3/0485* (2013.01)
*G06F 3/0488* (2013.01)
(Continued)

(52) U.S. Cl.
CPC ........ *G06F 3/04855* (2013.01); *G06F 3/0412* (2013.01); *G06F 3/0416* (2013.01);
(Continued)

(58) Field of Classification Search
None
See application file for complete search history.

(56) References Cited

U.S. PATENT DOCUMENTS

2004/0216056 A1    10/2004    Tootill
2008/0168384 A1*    7/2008    Platzer et al. ................ 715/784
(Continued)

FOREIGN PATENT DOCUMENTS

CN    101446884 A    6/2009
CN    101515218 A    8/2009
(Continued)

OTHER PUBLICATIONS

"ScrollTop Property", [online], Apr. 2012, retrieved from the internet <https://msdn.microsoft.com/en-us/library/ms534618(v=vs.85).aspx>.*

(Continued)

*Primary Examiner* — Stella Higgs
(74) *Attorney, Agent, or Firm* — Fish & Richardson P.C.

(57) ABSTRACT

The present invention relates to a system and method for performing a scroll using a scrollTop attribute of a web page, which allows a user to feel as if an individual contents area is actually scrolled if movement of a touched state is sensed when a portion of an individual contents area is displayed on a screen of a user terminal, by calculating a variation of touch coordinates according to the sensed movement of the touched state, determining a scroll direction according to the calculated variation of touch coordinates, calculating a scroll length corresponding to the variation of touch coordinates according to the sensed movement of the touched state and adjusting a scrollTop value of the individual contents area as much as the calculated scroll length.

6 Claims, 4 Drawing Sheets

(51) Int. Cl.
  *G06F 3/041*  (2006.01)
  *G09G 5/34*  (2006.01)
(52) U.S. Cl.
  CPC ........ *G06F 3/0485* (2013.01); *G06F 3/04883* (2013.01); *G09G 5/34* (2013.01); *G09G 2340/145* (2013.01); *G09G 2354/00* (2013.01)

(56) References Cited

U.S. PATENT DOCUMENTS

| | | | |
|---|---|---|---|
| 2009/0077465 A1 | 3/2009 | Walker | |
| 2009/0225038 A1* | 9/2009 | Bolsinga | G06F 3/04883 345/173 |
| 2010/0031167 A1* | 2/2010 | Roytman | G06F 17/30893 715/760 |
| 2012/0266068 A1* | 10/2012 | Ryman et al. | 715/719 |

FOREIGN PATENT DOCUMENTS

| | | |
|---|---|---|
| CN | 102314471 A | 1/2012 |
| JP | 2006031130 A | 2/2006 |
| JP | 2006078872 A | 3/2006 |
| JP | 2010049534 A | 3/2010 |
| JP | 2010257148 A | 11/2010 |
| JP | 2011501299 A | 1/2011 |
| JP | 2012033118 A | 2/2012 |
| JP | 2012118731 A | 6/2012 |
| KR | 1020090041635 A | 4/2009 |
| KR | 1020100063898 A | 6/2010 |
| KR | 1020110010096 A | 1/2011 |

OTHER PUBLICATIONS

"Scrolling a overflow:auto; element on a touch screen device", [online], May 2010, retrieved from the internet < http://chris-barr.com/2010/05/scrolling_a_overflowauto_element_on_a_touch_screen_device/>.*
"Touch & Scroll test", [online], retrieved from the internet < http://chrismbarr.github.io/TouchScroll/>.*
"Cant set scrollTop with window.onload", [online], Mar. 2012, retrieved from the internet < https://www.experts-exchange.com/questions/27623580/cant-set-scrollTop-with-window-onload.html>.*
International Search Report dated Oct. 10, 2013, for PCT/KR2013/006434.
Japanese Office Action for application No. 2014-540985 dated Sep. 25, 2014.
Office Action for corresponding Chinese Application No. 201380001488.3.

* cited by examiner

SYSTEM AND METHOD FOR PERFORMING SCROLL USING SCROLLTOP ATTRIBUTE OF WEB PAGE

TECHNICAL FIELD

The present invention relates to a system and method for performing a scroll using a scrollTop attribute of a web page, which allows a user to feel as if an individual contents area is actually scrolled by adjusting a scrollTop value even when a user terminal displays a portion of the individual contents area on a screen of the web page.

BACKGROUND ART

A mobile terminal which provides a wireless Internet service, i.e., a user terminal, mounts a wireless web browser so that a user may view a web page. In addition, as the size of the mobile terminal is limited, the wireless web browser or a web application allows the user to selectively view an interested contents area among the entire contents area by scrolling the contents.

On the other hand, although some terminals support div (i.e., individual contents area) scroll at a mobile web page, some terminals do not support the div scroll. In addition, although the div scroll is supported, if a developer arbitrarily sets a touch start event to preventDefault, even a function that can scroll the div cannot be used.

Accordingly, the div scroll function needs to be used at any terminal. That is, it needs to provide a service which can generate an effect of feeling as if the div is actually scrolled by receiving a touch event of a user and adjusting a scrollTop value of the div, without using an overflow attribute to scroll the div.

DISCLOSURE OF INVENTION

Technical Problem

Therefore, the present invention has been made in view of the above problems, and it is an object of the present invention to provide a system and method for performing a scroll using a scrollTop attribute of a web page, which allows a user to feel as if an individual contents area is actually scrolled if movement of a touched state is sensed when a portion of an individual contents area is displayed on a screen of a user terminal, by calculating a variation of touch coordinates according to the sensed movement of the touched state, determining a direction of the scroll according to the calculated variation of touch coordinates, calculating a scroll length corresponding to the variation of touch coordinates according to the sensed movement of the touched state and adjusting a scrollTop value of the individual contents area as much as the calculated scroll length.

Technical Solution

To accomplish the above object, according to one aspect of the present invention, there is provided a system for performing a scroll using a scrollTop attribute of a web page, the system including: a user terminal for displaying a portion of an individual contents area on a screen of the web page and sensing movement of a touched state on the displayed screen; and a web page providing server for calculating, if the movement of the touched state is sensed when a portion of the individual contents area is displayed on the screen of the user terminal, a variation of touch coordinates according to the sensed movement of the touched state, determining a scroll direction according to the calculated variation of touch coordinates, calculating a scroll length corresponding to the variation of touch coordinates according to the sensed movement of the touched state and adjusting a scrollTop value of the individual contents area as much as the calculated scroll length.

At this point, the individual contents area is divided into dins on an entire web page and includes a portion displayed on the user terminal and a portion which is not displayed on the user terminal.

In addition, the web page providing server determines the scroll direction to perform the scroll in a downward direction if a variation of a y coordinate value of the coordinate variation calculated according to the movement of the touched state is plus or to perform the scroll in an upward direction if the variation of the y coordinate value of the coordinate variation calculated according to the movement of the touched state is minus.

To accomplish the above object, according to another aspect of the present invention, there is provided a web page providing server including: a touch movement sensing signal receptor for receiving, when a portion of an individual contents area is displayed on a screen of a user terminal, a touch movement sensing signal according to sensing movement of a touched state on the displayed screen; a scroll direction determinator for calculating a variation of touch coordinates according to the sensed movement of the touched state and determining a scroll direction according to the calculated variation of touch coordinates; a scroll length calculator for calculating a scroll length corresponding to the variation of touch coordinates according to the sensed movement of the touched state; and a scrollTop adjustor for adjusting a scrollTop value of the individual contents area as much as the calculated scroll length.

At this point, the individual contents area is divided into dins on an entire web page and includes a portion displayed on the user terminal and a portion which is not displayed on the user terminal.

In addition, the scroll direction determinator determines the scroll direction to perform the scroll in a downward direction if a variation of a y coordinate value of the coordinate variation calculated according to the movement of the touched state is plus or to perform the scroll in an upward direction if the variation of the y coordinate value of the coordinate variation calculated according to the movement of the touched state is minus.

To accomplish the above object, according to still another aspect of the present invention, there is provided a method of performing a scroll using a scrollTop attribute of a web page, the method including the steps of: displaying, by a user terminal, a portion of an individual contents area on a screen; transmitting, by the user terminal, a touch movement sensing signal to a web page providing server as movement of a touched state on the displayed screen is sensed; calculating, by the web page providing server if the touch movement sensing signal is received, a variation of touch coordinates according to the movement of the touched state based on the touch movement sensing signal, and determining a scroll direction according to the calculated variation of touch coordinates; calculating, by the web page providing server, a scroll length corresponding to the variation of touch coordinates according to the movement of the touched state based on the touch movement sensing signal; and adjusting, by the web page providing server, a scrollTop value of the individual contents area as much as the calculated scroll length.

At this point, the individual contents area is divided into dins on an entire web page and includes a portion displayed on the user terminal and a portion which is not displayed on the user terminal.

To accomplish the above object, according to still another aspect of the present invention, there is provided a method of performing a scroll using a scrollTop attribute of a web page, the method including the steps of: receiving, when a portion of an individual contents area is displayed on a screen of a user terminal, a touch movement sensing signal as movement of a touched state on the displayed screen is sensed; calculating a variation of touch coordinates according to the movement of the touched state based on the touch movement sensing signal; determining a scroll direction according to the calculated variation of touch coordinates; calculating a scroll length corresponding to the variation of touch coordinates according to the movement of the touched state based on the touch movement sensing signal; and adjusting a scrollTop value of the individual contents area as much as the calculated scroll length.

At this point, the individual contents area is divided into dins on an entire web page and includes a portion displayed on the user terminal and a portion which is not displayed on the user terminal.

To accomplish the above object, according to still another aspect of the present invention, there is provided a recording medium that can be read by an electronic apparatus, in which a method of performing a scroll by a web page providing server using a scrollTop attribute of a web page can be recorded as a program, the method comprising the steps of: receiving, when a portion of an individual contents area is displayed on a screen of a user terminal, a touch movement sensing signal as movement of a touched state on the displayed screen is sensed; calculating a variation of touch coordinates according to the movement of the touched state based on the touch movement sensing signal; determining a scroll direction according to the calculated variation of touch coordinates; calculating a scroll length corresponding to the variation of touch coordinates according to the movement of the touched state based on the touch movement sensing signal; and adjusting a scrollTop value of the individual contents area as much as the calculated scroll length.

Advantageous Effects

As described above, the present invention may provide a system and method for performing a scroll using a scrollTop attribute of a web page, which allows a user to feel as if an individual contents area is actually scrolled if movement of a touched state is sensed when a portion of an individual contents area is displayed on a screen of a user terminal, by calculating a variation of touch coordinates according to the sensed movement of the touched state, determining a scroll direction according to the calculated variation of touch coordinates, calculating a scroll length corresponding to the variation of touch coordinates according to the sensed movement of the touched state and adjusting a scrollTop value of the individual contents area as much as the calculated scroll length.

In addition, an individual contents area may be scrolled at all user terminals including terminals which do not support scroll of the individual contents area (i.e., div scroll), and the scroll function may be performed even when a touch start event is set to preventDefault.

DESCRIPTION OF SYMBOLS

Figure 1:
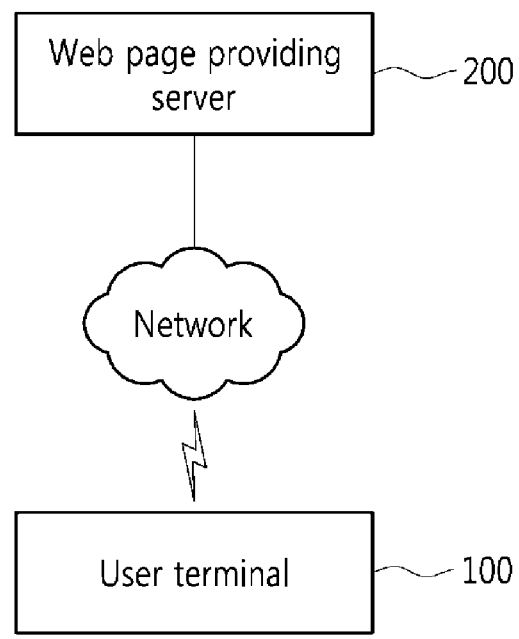
FIG. 1 is a view showing the configuration of a system for performing a scroll using a scrollTop attribute of a web page according to an embodiment of the present invention.

100: User terminal　　200: Web page providing server
202: Touch movement sensing signal reception
204: Scroll direction determinator
206: Scroll length calculator
208: ScrollTop adjustor

BEST MODE FOR CARRYING OUT THE INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

FIG. 1 is a view showing the configuration of a system for performing a scroll using a scrollTop attribute of a web page according to an embodiment of the present invention.

Referring to FIG. 1, the system for performing a scroll using a scrollTop attribute of a web page according to the present invention may include a user terminal 100 and a web page providing server 200.

The user terminal 100 displays a portion of an individual contents area, i.e., a div, on the screen of a web page in association with the web page providing server 200, and if movement of a touched state on the displayed screen is sensed according to handling of a user, the user terminal 100 may transmit corresponding information to the web page providing server 200.

If movement of a touched state is sensed when a portion of the individual contents area is displayed on the screen of the user terminal 100, the web page providing server 200 calculates a variation of touch coordinates according to the sensed movement of the touched state, determines a scroll direction according to the calculated variation of touch coordinates, calculates a scroll length corresponding to the variation of touch coordinates according to the sensed movement of the touched state and adjusts a scrollTop value of the individual contents area as much as the calculated scroll length. At this point, the individual contents area is divided into dins on the entire web page and may include a portion displayed on the user terminal and a portion which is not displayed on the user terminal.

In addition, the web page providing server 200 may determine a scroll direction to perform the scroll in the downward direction if the variation of the y coordinate value of the coordinate variation calculated according to the movement of the touched state is plus (+) or to perform the scroll in the upward direction if the variation of the y coordinate value of the coordinate variation calculated according to the movement of the touched state is minus (−).

Figure 2:
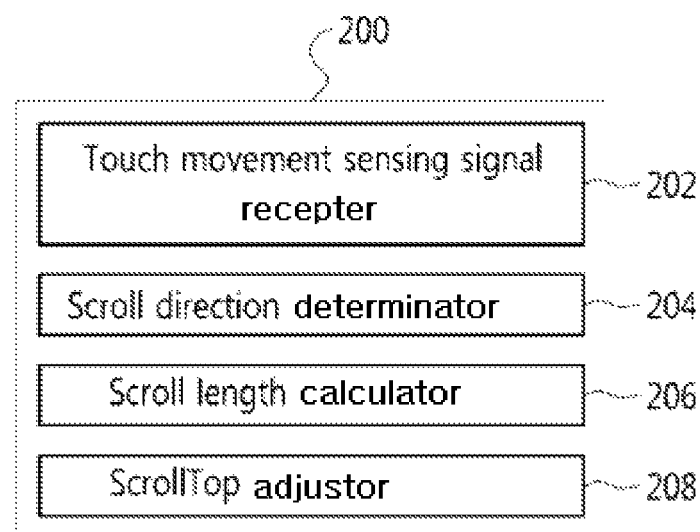
FIG. 2 is a view showing the internal configuration of a web page providing server according to an embodiment of the present invention.

FIG. 2 is a view showing the internal configuration of a web page providing server according to an embodiment of the present invention.

Referring to FIG. 2, the web page providing server 200 according to the present invention may include a touch movement sensing signal receptor 202, a scroll direction determinator 204, a scroll length calculator 206, and a scrollTop adjustor 208.

When a portion of the individual contents area is displayed on the screen of the user terminal, the touch movement sensing signal receptor 202 may receive a touch movement sensing signal according to sensing the movement of the touched state on the displayed screen. At this point, the individual contents area is divided into dins on the entire web page and may include a portion displayed on the user terminal and a portion which is not displayed on the user terminal.

The scroll direction determinator 204 may calculate a variation of touch coordinates according to the sensed movement of the touched state and determine a scroll direction according to the calculated variation of touch coordinates. At this point, the scroll direction determinator 204 may determine a scroll direction to perform the scroll in the downward direction if the variation of the y coordinate value of the coordinate variation calculated according to the movement of the touched state is plus or to perform the scroll in the upward direction if the variation of the y coordinate value is minus.

The scroll length calculator 206 may calculate a scroll length corresponding to the variation of touch coordinates according to the sensed movement of the touched state.

The scrollTop adjustor 208 may adjust a scrollTop value of the individual contents area as much as the calculated scroll length.

Accordingly, if a lot of contents are contained in the individual contents area, i.e., in one div, and all the contents are not displayed on the screen, the div is scrolled so that a user may view all the contents in the portion invisible to the user.

Figure 3:
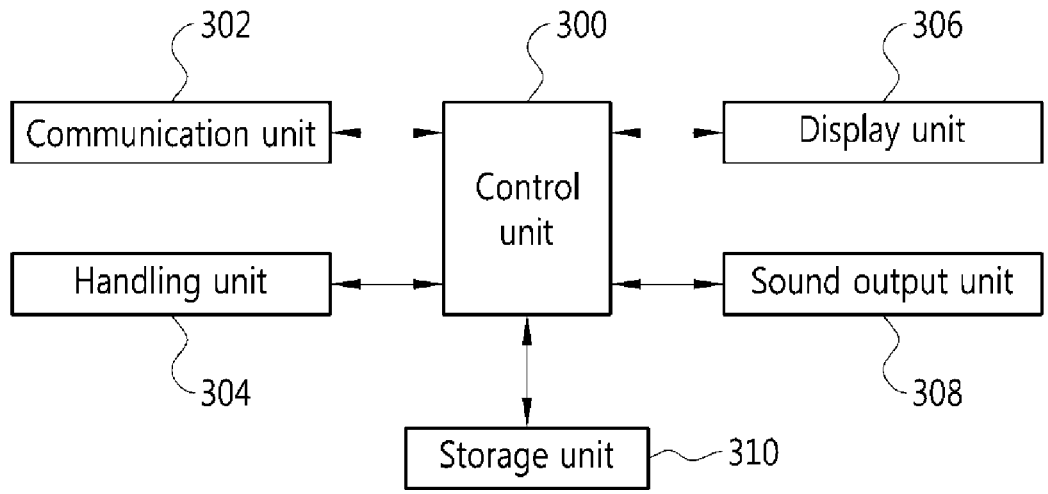
FIG. 3 is a view showing the internal configuration of a user terminal according to an embodiment of the present invention.
Figure 4:
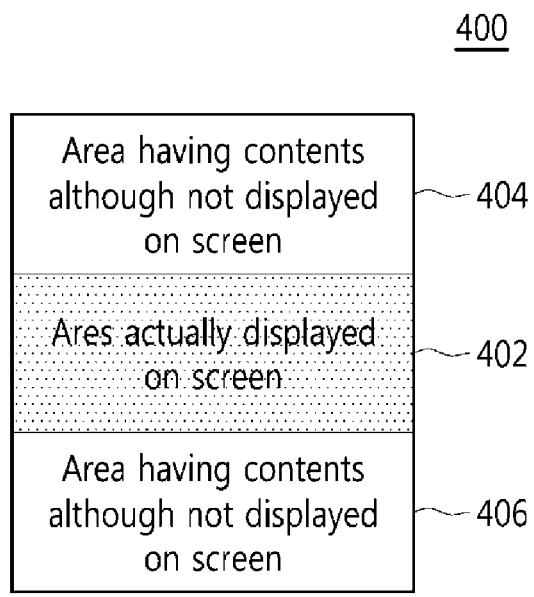
FIG. 4 is a view showing an individual contents area according to an embodiment of the present invention.

FIG. 3 is a view showing the internal configuration of a user terminal according to an embodiment of the present invention, and FIG. 4 is a view showing an individual contents area according to an embodiment of the present invention.

Referring to FIG. 3, the user terminal according to an embodiment of the present invention may include a communication unit 302, a handling unit 304, a display unit 306, a sound output unit 308, a storage unit 310 and a control unit 300.

The communication unit 302 may include a mobile communication module, a wireless Internet module, a short range communication module and the like. The mobile communication module transmits and receives wireless signals of a base station on a mobile communication network, and the wireless Internet module is a module for wireless Internet connection, and the short range communication module is a module for short range communication. At this point, the communication unit 302 may associate with the web page providing server 200 through the wireless Internet module.

The handling unit 304 generates an input data according to handling of a user for operation and control. The handling unit may be configured of a key pad, a dome switch, a touch pad and the like. Particularly, the touch pad may be implemented as a touch screen configuring a layer structure together with a display unit.

The display unit 306 displays the information processed in the user terminal on the screen and further includes a touch sense module to receive a handling signal according to handling of a user. That is, the display unit 306 may display a portion of the individual contents area on the screen of the web page and sense movement of a touched state according to handling of the user on the displayed screen.

The sound output unit 308 may output a voice signal received through the communication unit in a communication mode or the like or an audio data stored in the storage unit.

The storage unit 310 may store a program for the process and control of the control unit 300 and may temporarily store input or output data.

The control unit 300 generally controls overall operation of the user terminal by controlling operation of each part of the terminal.

In addition, when a portion of the individual contents area is displayed on the screen of a web page, if movement of a touched state according to handling of the user on the displayed screen is sensed, the control unit 300 may control to transmit corresponding information to the web page providing server.

At this point, as shown in FIG. 4, the individual contents area 400 according to an embodiment of the present invention may include an area which has contents although the contents are not displayed on the screen 404 and 406 and an area actually displayed on the screen.

Figure 5:
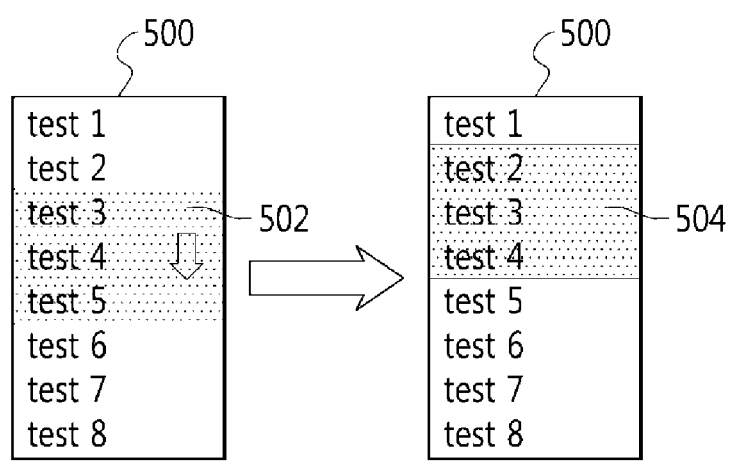
FIG. 5 is a view showing flow of a screen which displays a portion of an individual contents area according to an embodiment of the present invention.

FIG. 5 is a view showing flow of a screen which displays a portion of an individual contents area according to an embodiment of the present invention.

Referring to FIG. 5, the individual contents area 500 according to an embodiment of the present invention may include contents of test1 to test8, and a first web page screen 502 displayed on the user terminal may include contents of test3 to test5.

At this point, if movement of a touched state is sensed at the terminal according to handling of a user, it is possible to calculate a variation of touch coordinates according to the sensed movement of the touched state, determine a scroll direction according to the calculated variation of touch coordinates, calculate a scroll length corresponding to the variation of touch coordinates according to the sensed movement of the touched state, and adjust a scrollTop value of the individual contents area as much as the calculated scroll length.

For example, it is controlled to perform the scroll in the downward direction if the variation of the y coordinate value of the coordinate variation calculated according to the movement of the touched state is plus (+), and the user terminal may display a second web page screen 504 including contents of test2 to test4.

Figure 6:
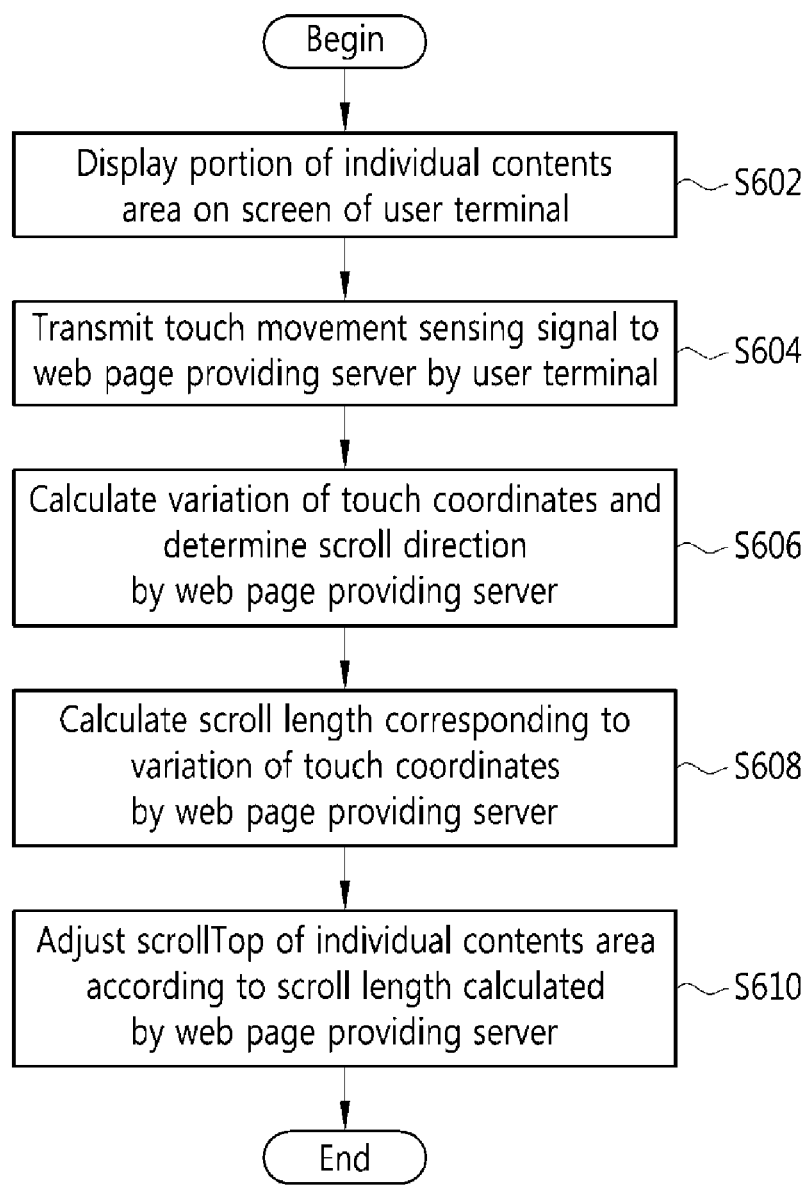
FIG. 6 is a flowchart illustrating a method of performing a scroll using a scrollTop attribute of a web page according to an embodiment of the present invention.

FIG. 6 is a flowchart illustrating a method of performing a scroll using a scrollTop attribute of a web page according to an embodiment of the present invention.

Referring to FIG. 6, a portion of an individual contents area is displayed on the screen of the user terminal according to the present invention S602, and a touch movement sensing signal is transmitted to the web page providing server as movement of a touched state according to handling of the user on the displayed screen is sensed S604.

At this point, the individual contents area is divided into dins on the entire web page and may include a portion displayed on the user terminal and a portion which is not displayed on the user terminal.

If the touch movement sensing signal is received, the web page providing server calculates a variation of touch coordinates according to the movement of the touched state based on the touch movement sensing signal and determines a scroll direction according to the calculated variation of touch coordinates S606.

At this point, the web page providing server may determine a scroll direction to perform the scroll in the downward direction if the variation of the y coordinate value of the coordinate variation calculated based on the touch movement sensing signal is plus or to perform the scroll in the upward direction if the variation of the y coordinate value of the coordinate variation calculated according to the movement of the touched state is minus.

In addition, the web page providing server calculates a scroll length corresponding to the variation of touch coordinates according to the movement of the touched state based on the touch movement sensing signal S608 and adjusts a scrollTop value of the individual contents area as much as the scroll length calculated by the web page providing server S610.

On the other hand, according to another aspect of the present invention, there is provided a method of performing a scroll by a web page providing server using a scrollTop attribute of a web page, the method including the steps of: receiving, when a portion of an individual contents area is displayed on a screen of a user terminal, a touch movement sensing signal as movement of a touched state on the displayed screen is sensed; calculating a variation of touch coordinates according to the movement of the touched state based on the touch movement sensing signal; determining a scroll direction according to the calculated variation of touch coordinates; calculating a scroll length corresponding to the variation of touch coordinates according to the movement of the touched state based on the touch movement sensing signal; and adjusting a scrollTop value of the individual contents area as much as the calculated scroll length.

In addition, according to still another aspect of the present invention, a method of performing a scroll by a web page providing server using a scrollTop attribute of a web page can be recorded as a program in a recording medium that can be read by an electronic apparatus, the method including the steps of: receiving, when a portion of an individual contents area is displayed on a screen of a user terminal, a touch movement sensing signal as movement of a touched state on the displayed screen is sensed; calculating a variation of touch coordinates according to the movement of the touched state based on the touch movement sensing signal; determining a scroll direction according to the calculated variation of touch coordinates; calculating a scroll length corresponding to the variation of touch coordinates according to the movement of the touched state based on the touch movement sensing signal; and adjusting a scrollTop value of the individual contents area as much as the calculated scroll length.

The method of performing a scroll using a scrollTop attribute of a web page in the web page providing server may be created as a program, and codes and code segments configuring the program may be easily inferred by programmers in the art. In addition, the program related to the method of performing a scroll using a scrollTop attribute of a web page in the web page providing server may be stored in an information storage medium (a readable medium) that can be read by an electronic apparatus and read and executed by the electronic apparatus.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention can be used to provide a system and method for performing a scroll using a scrollTop attribute of a web page, which allows a user to feel as if an individual contents area is actually scrolled if movement of a touched state is sensed when a portion of an individual contents area is displayed on a screen of a user terminal, by calculating a variation of touch coordinates according to the sensed movement of the touched state, determining a scroll direction according to the calculated variation of touch coordinates, calculating a scroll length corresponding to the variation of touch coordinates according to the sensed movement of the touched state and adjusting a scrollTop value of the individual contents area as much as the calculated scroll length.

The invention claimed is:

1. A web page providing server, the server comprising a processor, wherein said processor comprising:
   a touch movement sensing signal receptor configured to receive, from a user terminal when a portion of an individual contents area having a prevented div scroll is displayed on a screen of the user terminal, a touch movement sensing signal according to sensing movement of a touched state on the displayed screen;
   a scroll direction determinator configured to
      calculate a variation of touch coordinates according to the sensed movement of the touched state and
      determine a scroll direction according to the calculated variation of touch coordinates;
   a scroll length calculator configured to calculate a scroll length corresponding to the variation of touch coordinates according to the sensed movement of the touched state; and
   a scrollTop adjustor configured to
      adjust a scrollTop value of the individual contents area as much as the calculated scroll length, and
      provide the individual contents area having the adjusted scrollTop value to the user terminal and replacing the div scroll prevented by the user terminal
   wherein the individual contents area is divided into Division Markers (divs) on an entire web page and includes a portion displayed on the user terminal and a portion which is not displayed on the user terminal, and
   wherein the scrollTop adjustor is configured to adjust a scrollTop value of a div without using an overflow attribute to scroll the div.

2. The server according to claim 1, wherein the scroll direction determinator is configured to,
   when a variation of a y coordinate value of the coordinate variation calculated according to the movement of the touched state is plus, determine the scroll direction to perform the scroll in a downward direction, and
   when the variation of y coordinate value of the coordinate variation calculated according to the movement of the touched state is minus, determine the scroll direction to perform the scroll in an upward direction.

3. A method of performing a scroll by a web page providing server using a scrollTop attribute of a web page, the method comprising:
  receiving, when a portion of an individual contents area having a prevented div scroll is displayed on a screen of a user terminal, a touch movement sensing signal as movement of a touched state on the displayed screen is sensed;
  calculating a variation of touch coordinates according to the movement of the touched state based on the touch movement sensing signal;
  determining a scroll direction according to the calculated variation of touch coordinates;
  calculating a scroll length corresponding to the variation of touch coordinates according to the movement of the touched state based on the touch movement sensing signal;
  adjusting a scrollTop value of the individual contents area as much as the calculated scroll length; and
  providing the individual contents area having the adjusted scrollTop value to the user terminal and replacing the div scroll prevented by the user terminal,
  wherein the individual contents area is divided into Division Markers (divs) on an entire web page and includes a portion displayed on the user terminal and a portion which is not displayed on the user terminal, and
  wherein a scrollTop value of a div is adjusted without using an overflow attribute to scroll the div.

4. The method according to claim 3, wherein the determining a scroll direction determines the scroll direction to perform
  when a variation of a y coordinate value of the coordinate variation calculated according to the movement of the touched state is plus, the scroll in a downward direction, and
  when a variation of a y coordinate value of the coordinate variation calculated according to the movement of the touched state is minus, the scroll in an upward direction.

5. A method of performing a scroll using a scrollTop attribute of a web page, the method comprising:
  displaying, by a user terminal, a portion of an individual contents area having a prevented div scroll on a screen;
  transmitting, by the user terminal, a touch movement sensing signal to a web page providing server as movement of a touched state on the displayed screen is sensed;
  calculating, by the web page providing server when the touch movement sensing signal is received, a variation of touch coordinates according to the movement of the touched state based on the touch movement sensing signal, and determining a scroll direction according to the calculated variation of touch coordinates;
  calculating, by the web page providing server, a scroll length corresponding to the variation of touch coordinates according to the movement of the touched state based on the touch movement sensing signal;
  adjusting, by the web page providing server, a scrollTop value of the individual contents area as much as the calculated scroll length; and
  providing, by the web page providing server, the individual contents area having the adjusted scrollTop value to the user terminal and replacing the div scroll prevented by the user terminal,
  wherein the individual contents area is divided into Division Markers (divs) on an entire web page and includes a portion displayed on the user terminal and a portion which is not displayed on the user terminal, and
  wherein a scrollTop value of a div is adjusted without using an overflow attribute to scroll the div.

6. A non-transitory computer-readable recording medium recording a computer program for causing a web page providing server to execute a method of performing a scroll using a scrollTop attribute of a web page, the method comprising:
  receiving, when a portion of an individual contents area having a prevented div scroll is displayed on a screen of a user terminal, a touch movement sensing signal as movement of a touched state on the displayed screen is sensed;
  calculating a variation of touch coordinates according to the movement of the touched state based on the touch movement sensing signal;
  determining a scroll direction according to the calculated variation of touch coordinates;
  calculating a scroll length corresponding to the variation of touch coordinates according to the movement of the touched state based on the touch movement sensing signal;
  adjusting a scrollTop value of the individual contents area as much as the calculated scroll length; and
  providing the individual contents area having the adjusted scrollTop value to the user terminal and replacing the div scroll prevented by the user terminal,
  wherein the individual contents area is divided into Division Markers (divs) on an entire web page and includes a portion displayed on the user terminal and a portion which is not displayed on the user terminal, and
  wherein a scrollTop value of a div is adjusted without using an overflow attribute to scroll the div.

* * * * *